United States Patent [19]

Saelens et al.

[11] Patent Number: 4,883,205
[45] Date of Patent: Nov. 28, 1989

[54] INSULATED BOTTLE RACK APPARATUS FOR BICYCLES

[76] Inventors: William R. Saelens, 313 SE. Uehlamar; Gary L. Osborne, 2714 NW. 4th Cir., both of Ankeny, Iowa 50021

[21] Appl. No.: 309,710

[22] Filed: Feb. 13, 1989

[51] Int. Cl.$^4$ ............................................... B62J 9/00
[52] U.S. Cl. ............................... 224/32 R; 224/30 R; 224/39; 224/35; 215/100 R; 220/85 H; 248/311.2
[58] Field of Search ...................... 224/30 R, 32 R, 35, 224/39, 41; 248/311.2, 314; 215/100 R, 13.1, 12.1; 220/85 H

[56] References Cited

U.S. PATENT DOCUMENTS 3,263,806  8/1966  Ring .
3,472,568 10/1969  Southwick .
3,717,282  2/1973  Nordskog .
4,193,525  3/1980  Sommers ............................. 224/41
4,228,908 10/1980  Tweeton .
4,596,370  6/1986  Adkins ................................. 224/41
4,754,902  7/1988  Opfergelt ............................. 224/41

OTHER PUBLICATIONS

Catalog from Performance Bicycle Shop, p. 38, showing water bottles and water bottle cages.
Catalog from Bike World, 1988 Cycling Guide, varous pages showing water bottles and water bottle cages.

Primary Examiner—Henry J. Recla
Assistant Examiner—Keith Kupferschmid
Attorney, Agent, or Firm—Henderson & Sturm

[57] ABSTRACT

An insulated bottle rack apparatus for bicycles having a rack or cage with a bottle receiving area and including a first side and a second side opposite to the first side, whereby the first and second sides tightly hold against a bottle disposed therein. A foam rubber sleeve extends around the exterior of the rack for insulating a bottle being held by the rack. Structure is also provided for connecting the bottle holding rack to a bicycle.

16 Claims, 3 Drawing Sheets

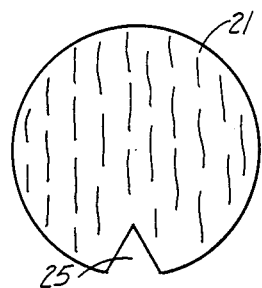 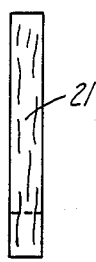 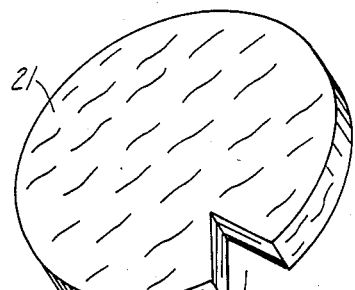
Fig. 7  Fig. 8  Fig. 9
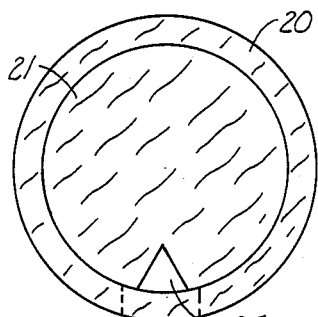 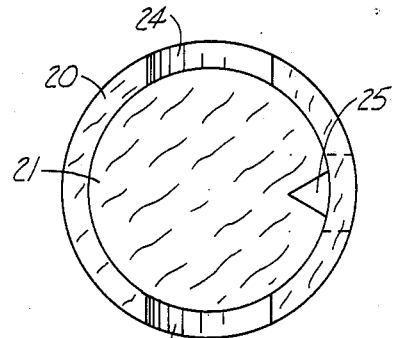
Fig. 5  Fig. 6
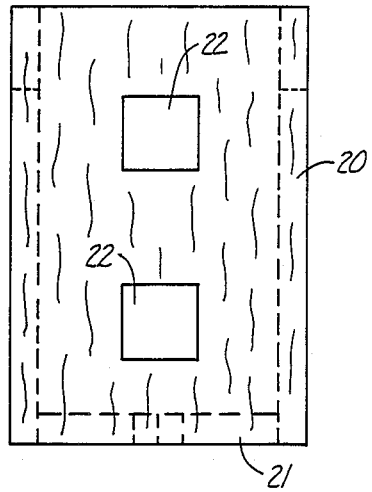 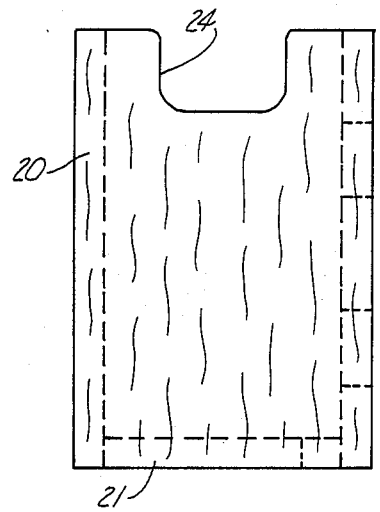
Fig. 3  Fig. 4

INSULATED BOTTLE RACK APPARATUS FOR BICYCLES

TECHNICAL FIELD

The present invention relates to a liquid bottle rack apparatus for bicycles and more particularly to one of an insulated configuration.

BACKGROUND ART

Bicycle water bottle racks, commonly referred to as bottle cages, are typically made from a rod or heavy wire metal material bent into shape similar to that shown in the drawings. This shape permits a properly sized plastic bottle could be frictionally forced into the rack or cage while the rack is attached to a bicycle either by deforming slightly the wire rack, by deforming the bottle, or both.

Of course insulated containers are not new. For example, see U.S. Pat. No. 3,472,568 to Southwick which shows an insulated container for a bottle. U.S. Pat. No. 4,193,525 to Sommers shows an insulated container connected to a bicycle for receiving beverage containers, such as soft drink cans for keeping them cold.

Bicycle water bottle cages have become standardized to accept a 20-ounce standard shaped bottle. One manufacturer of such equipment offers a neoprene cover that fits over a standard shaped water bottle and this manufacturer contends that the bottle and insulated cover will still both fit into a standard bottle cage. There is a question, however, whether there can be both adequate insulation and freedom to get such insulated bottle easily into and out of a standard water bottle cage.

Consequently, there exists a need for an improved insulated bottle rack apparatus for bicycles.

DISCLOSURE OF THE INVENTION

The present invention relates to an insulated bottle rack apparatus for bicycles having a rack or cage with a bottle receiving area and including a first side and a second side opposite to the first side, whereby the first and second sides tightly hold against a bottle disposed therein. A foam rubber sleeve extends around the exterior of the rack for insulating a bottle being held by the rack. Structure is also provided for connecting the bottle holding rack to a bicycle.

An object of the present invention is to provide an insulated bottle rack apparatus for bicycles.

Another object of the present invention is to provide a structure for insulating bicycle water bottles by adapting an insulated sleeve to fit over standardized bottle holding racks or cages.

A further object of the present invention is to provide an insulating sleeve of the aforementioned type which instead of merely having a bottle or container therein, has a bottle holding rack therein for selectively receiving a water bottle.

A still further object of the present invention is to provide an insulated sleeve of the aforementioned type which will fit nearly any pre-existing bicycle bottle rack and can therefore be purchased for addition to an already existing bottle holding rack or it can be purchased in combination with a brand new bottle holding rack or cage.

Other objects, advantages, and novel features of the present invention will become apparent from the following detailed description of the invention when considered in conjunction with the accompanying drawings.

BRIEF DESCRIPTION OF THE DRAWINGS

FIG. 3 is a rear view of the insulating sleeve of the present invention;

FIG. 4 is a side view of the insulated sleeve of the present invention;

FIG. 5 is a bottom view of the insulated sleeve of the present invention showing a bottom therein with a drain vent disposed therein;

FIG. 6 is a top view of the insulating sleeve of the present invention;

FIG. 7 is a bottom view of just the bottom insert of the water bottle rack insulator;

FIG. 8 is a side view of the bottom;

FIG. 9 is perspective view of the bottom insert;

BEST MODE FOR CARRYING OUT THE INVENTION

Figures 1, 2, 10:
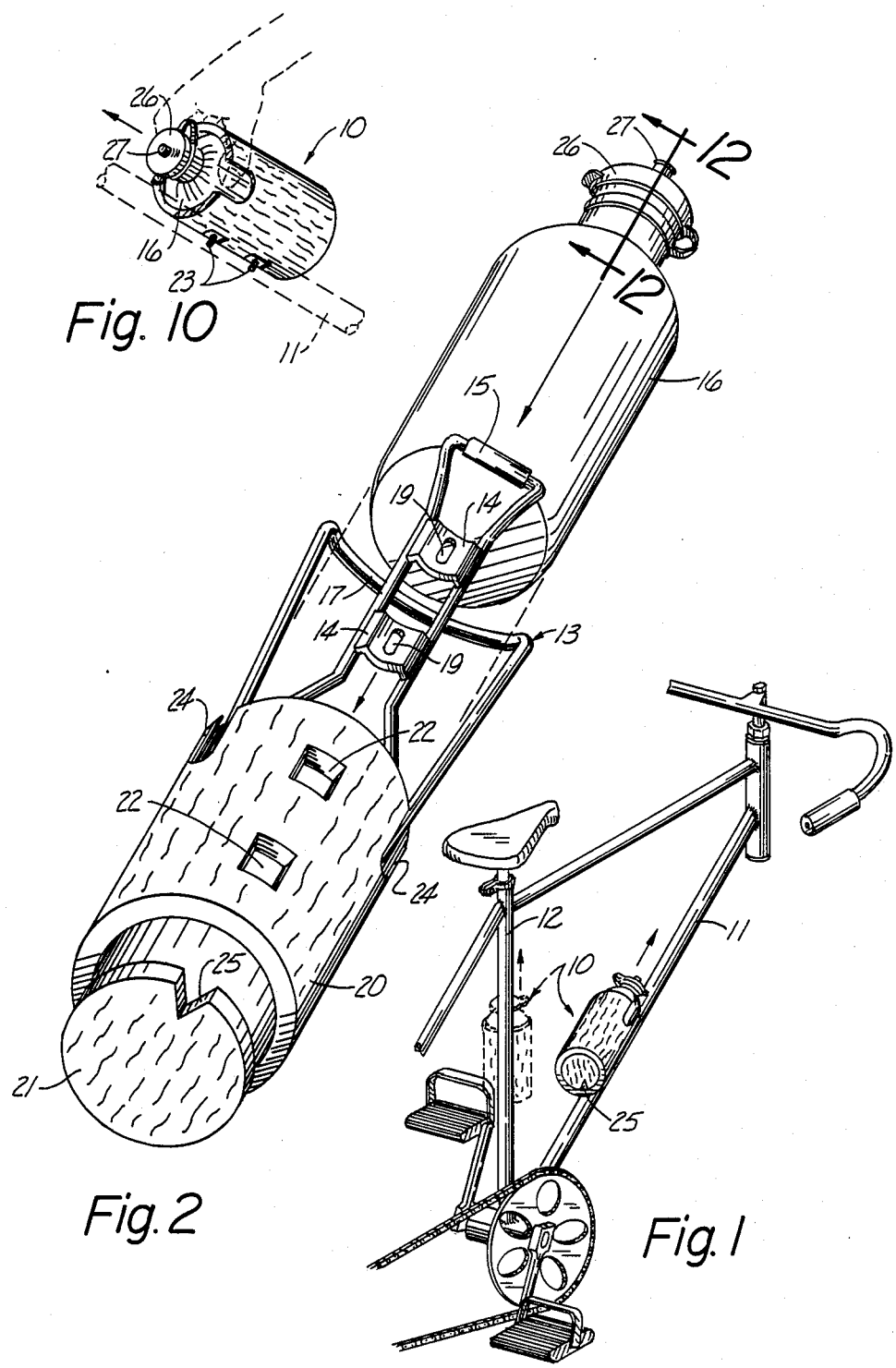
FIG. 1 is a perspective view of a portion of a bicycle having a preferred embodiment of the present invention attached thereto and also showing in dashed lines an alternate position where such apparatus can be attached to the bicycle.
FIG. 2 is an enlarged perspective view of a preferred embodiment of the present invention shown in an exploded form.
FIG. 10 is a perspective view showing how the bottle is removed from the insulated rack of the present invention.

Referring now to the drawings wherein like reference numerals designate identical or corresponding parts throughout the several views, FIG. 1 shows an insulated bottle rack apparatus (10) with a bottle therein attached to a bicycle frame member (11). It is also shown in FIG. 1 that the insulated bottle rack apparatus (10) can be attached to structural member (12) instead of to structural member (11) if desired.

Figure 11:
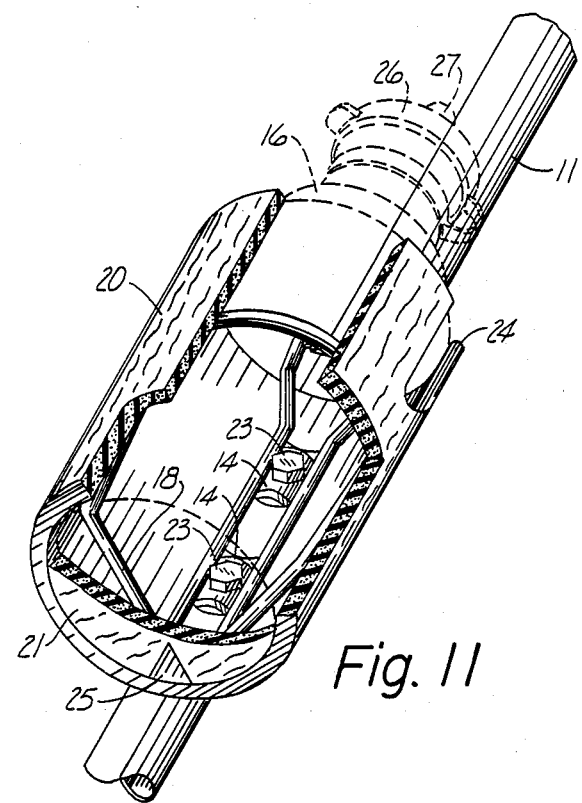
FIG. 11 is a perspective view of the present invention showing the front and top thereof and showing how it is attached to a bicycle frame member.

Referring to FIGS. 2 and 11, it is noted that a metal wire cage or rack (13) is bent into a configuration having a first side with brackets (14) welded thereto and having a plastic member (15) attached thereto to prevent damage to the bottle (16) as it is forced into and out of the rack (13). The other side of the rack has a portion (17) thereon and the rack (13) also has bottom members (18) as can readily be seen in FIG. 11. It is to be noted that this rack or cage (13) shown in the drawings is a standard cage or rack (13) which can be commercially purchased. The rack (13) forms a part of the present invention in combination with the other elements recited in the claims, most notably a foam rubber sleeve (20) having a foam rubber bottom (21).

The foam rubber sleeve (20) and bottom (21) are preferably constructed of a non absorbent foam rubber such as a closed cell polyvinylchloride or a polyester urethane foam. This sleeve (20) and bottom (21) can of course be constructed of other insulated materials, but they should be of a material which is durable and is flexible enough to tightly be received around the bike cage or rack (13) while at the same time having good insulating properties.

The sleeve (20) has a pair of openings (22) therein so that the bolts (23), shown in FIG. 10, can extend through openings (19) in the brackets (14) and be threadably received into the structural tube (11) of the bicycle shown in FIG. 1. It is to be understood of course that other structures for attaching the cage (13) to the bicycle tubes (11) or (12) are fully equivalent to the structure shown. For example, instead of using bolts (23), straps that extend around the tubular member (11) can be tightened down and attached to the cage or rack (13) by brackets similar to the brackets (14).

Optional cut-out portions (24) in the top of the foam rubber sleeve (20) are provided for easily gripping the bottle (16) in the manner shown in FIG. 10. Also, a drain slot (25) is optionally provided in the bottom of the insulator bottom (21) for allowing condensation to drain from the insulated sleeve (20).

Figure 12:
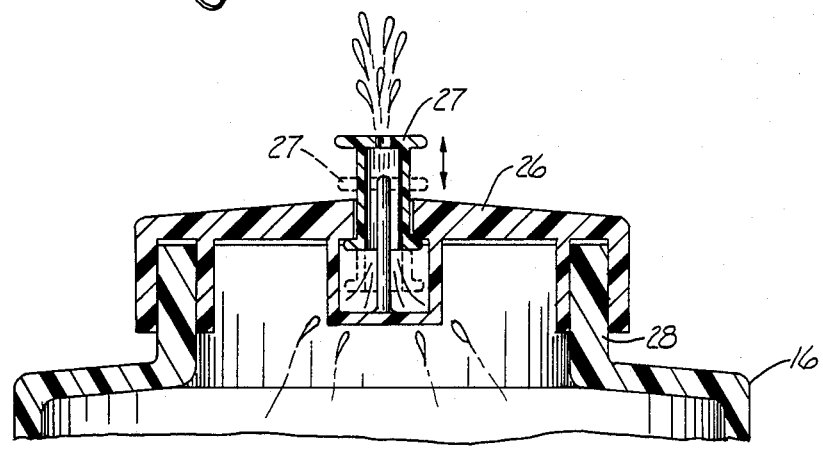
FIG. 12 is a cross-sectional view of the valve member of the bottle.

While bottles having tops of various configurations can be used, the bottle (16) is of a typical configuration that has a cap (26) frictionally engaged over the lip (28) of the bottle (16) and a reciprocating valve member (27) can be moved from the position shown in dashed lines in FIG. 12 wherein the valve (27) is closed, to a position shown in solid lines in FIG. 12 wherein the valve is opened to allow liquid therein to flow in the direction of the arrows shown in FIG. 12. This cap configuration is a prior art structure not developed by the Patentee herein, but this type of water bottle cap is of the type used in combination with bottles for bicycle cages or racks (13) because someone riding a bicycle can easily use such a water bottle without fear of spilling the contents therein.

In operation, the sleeve (20) is placed around a standard water bottle cage or rack (13) in the manner shown in FIG. 2 whereby the openings (19) are aligned with the opening (22) in the foam rubber sleeve (20). The bottom (21) can be affixed to the sleeve (20) either before or after the sleeve (20) is placed around the water bottle cage or rack (13). The drain hole (25) should be positioned as shown in FIG. 1 so that it is at the bottom to drain water from condensation at the lowest part of the foam rubber sleeve (20).

Once the insulated sleeve (20) and cage or rack (13) are secured to bicycle frame members (11) or (12), the bottle (16) can be filled with water or any other liquid desired and inserted into the cage or rack (13) in a conventional fashion by deforming the container (16), the wire cage or rack (13), or both. The cage or rack (13) has a certain degree of spring-like resiliency in that it can be deformed slightly and it will return to its original condition to frictionally hold the water bottle (16) in place.

When it is desired to use the water bottle (16) to drink therefrom, the bottle (16) can be grasped at the slots (24), as is shown in FIG. 10, and the bottle is merely pulled out of the rack (13). It can then be reinserted after use or after refilling thereof.

Accordingly, it will be appreciated that the preferred embodiment disclosed herein does indeed accomplish the aforementioned objects. Obviously many modifications and variations of the present invention are possible in light of the above teachings. It is therefore to be understood that, within the scope of the appended claims, the invention may be practiced otherwise that as specifically described.

We claim:

1. An insulated liquid bottle rack apparatus for bicycles comprising:
    means for receivingly holding a bottle, said means defining an interior of a bottle receiving area and an exterior, including a first side, a second side opposite to said first side, and a bottom interconnecting the first and second sides;
    means connected to the first side of the bottle holding means for selectively attaching said bottle holding means to a bicycle; and
    insulation means completely surrounding the exterior of said bottle holding means for insulating the bottle holding area of said bottle holding means.

2. The apparatus of claim 1 including a bottle disposed within said bottle holding area.

3. The apparatus of claim 2 wherein said bottle is in frictional contact with said bottle receiving means for tightly holding said bottle.

4. The apparatus of claim 3 including means for permitting said bottle to be selectively removed from and inserted into said bottle holding area of said bottle holding means.

5. The apparatus of claim 1 wherein said attaching means is attached to a bicycle.

6. The apparatus of claim 4 wherein said bottle is constructed of a deformable plastic material whereby the bottle can be deformed into and out from the bottle holding area.

7. The apparatus of claim 6 wherein said bottle has a removable top.

8. The apparatus of claim 7 wherein said removable top includes a slideable valve for selectively providing a small opening in said removable top.

9. The apparatus of claim 1 including an insulated bottom on said insulation means.

10. The apparatus of claim 9 including a drain hole in said insulated bottom for permitting condensation to exit the insulation means.

11. The apparatus of claim 1 including a pair of slots disposed across from each other on the top of said insulation means for providing easier access to said bottle holding area.

12. The apparatus of claim 11 wherein said slots are spaced from said first and second sides of said bottle holding means.

13. The apparatus of claim 1 wherein said insulation means is constructed of foam rubber.

14. The apparatus of claim 13 wherein said insulation means comprises a closed cell polyvinylchloride.

15. The apparatus of claim 13 wherein said insulation means is comprised of a urethane foam material.

16. The apparatus of claim 1 including at least one opening in the side of said insulation means for providing access between a bicycle and the attaching means.

* * * * *